United States Patent
Alperovich et al.

(12)

(10) Patent No.: US 6,338,935 B1
(45) Date of Patent: Jan. 15, 2002

(54) MULTI-LAYER OPTICAL INFORMATION CARRIERS WITH FLUORESCENT READING/RECORDING AND METHOD FOR THEIR PRODUCTION

(75) Inventors: Mark Alperovich, Ashdod; Irina Kiryushev, Ashkelon, both of (IL); Eugene Levich, New York, NY (US); Irene Zuhl, Ashdod (IL); Arik Khaikin, Holon (IL); Zeev Orbach, Tel Aviv (IL)

(73) Assignee: TriDStore IP LLC, New York, NY (US)

( * ) Notice: Subject to any disclaimer, the term of this patent is extended or adjusted under 35 U.S.C. 154(b) by 0 days.

(21) Appl. No.: 09/526,311

(22) Filed: Mar. 16, 2000

(30) Foreign Application Priority Data

Mar. 16, 1999 (IL) .................................. 129011

(51) Int. Cl.$^7$ .............................. G11B 7/24; G11B 7/26
(52) U.S. Cl. ................. 430/270.11; 430/321; 428/64.4; 427/510; 427/157; 427/164; 427/355; 427/372.2
(58) Field of Search ........................... 430/321, 270.11; 428/64.4; 427/510, 157, 164, 355, 372.2

(56) References Cited

U.S. PATENT DOCUMENTS

| 4,090,031 A | 5/1978 | Russell ....................... 358/130 |
| 5,847,141 A | 12/1998 | Malkin ........................ 546/34 |

FOREIGN PATENT DOCUMENTS

| EP | 0 460 346 A3 | 12/1991 |
| WO | WO 98/25268 | * 6/1998 |
| WO | WO 98/28739 | 7/1998 |
| WO | WO 98/28740 | 7/1998 |
| WO | WO 98/31018 | 7/1998 |
| WO | WO 98/50914 | 11/1998 |
| WO | WO 99/24527 | 5/1999 |
| WO | WO99/47377 | 9/1999 |

OTHER PUBLICATIONS

Herzig et al., Micro–Optics, Elements, Sytems and Applications, p. 153 (1997).

Shvartsman, Replication of Diffractive Optics, Diffractive and Miniaturized Optics, vol. CR49, pp. 117–137 (1993).

Patent Abstracts of Japan, vol. 9, No. 37, p. 335 (1985) & JP 59 178636 A (Toshiba KK), 1984.

\* cited by examiner

*Primary Examiner*—John A. McPherson
(74) *Attorney, Agent, or Firm*—Blank Rome Comisky & McCauley LLP

(57) ABSTRACT

A method of manufacturing a multi-layer optical information carrier with fluorescence reading/recording is presented. A structure is fabricated, being formed of a substrate carrying a fluorescent film on one or both surfaces thereof, wherein the substrate is transparent with respect to incident radiation used for the fluorescence reading/recording. A patterned structure is applied to the fluorescent film under predetermined process conditions, such as to produce a fluorescent patterned structure with a surface relief in the form of an array of discrete fluorescent regions. The same procedure is repeated a required number of times, so as to obtain at the end of the process a multi-layer optical information carrier.

32 Claims, 2 Drawing Sheets

MULTI-LAYER OPTICAL INFORMATION CARRIERS WITH FLUORESCENT READING/RECORDING AND METHOD FOR THEIR PRODUCTION

FIELD OF THE INVENTION

This invention relates to optical storage systems such as optical disks, cards, etc. which are of ROM (Read-Only-Memory), WORM (Write-One-Read-Many) or Rewritable types. In particular, the present invention relates to such system which utilize fluorescent materials.

BACKGROUND OF THE INVENTION

The following references are considered to be pertinent for the purpose of understanding the background of the present invention:

1. WO 98/50914;
2. WO 99/24527;
3. "Micro-Optics, Elements, Systems and Applications", Ed. H. P. Herzig, Taylor & Francis, p. 153 (1997);
4. WO 98/28739;
5. WO 98/28740;
6. WO 98/31018;
7. U.S. Pat. No. 5,847,141;
8. Shvartsman F. P. (1993). *Replication of Diffractive Optics*, Lee S. H. (ed.) Diffractive and Miniaturized Optics, Vol. CR49, pp. 117–137. Bellingham: SPIE.
9. U.S. Pat. No. 4,090,031.

The above references will be acknowledged in the text below by indicating their number in brackets.

The attractive unique features of optical storage devices are their high capacity, removability, mass replicability and long memory persistence for archival applications. They are most commonly used for software distribution, backup memory for personal computers and workstations, external memory for some mainframes and as large-capacity off-line memory. However, storage capacity and signal-to-noise ratio of the existing optical storage devices are not sufficient for the newly developed computers and new generation video systems since such devices typically comprise only one information-carrying layer. Therefore, materials for more advanced optical systems with increased information-recording density, high level of signal-to-noise, high resolution and low cost are worked up intensively.

The storage media of most optical storage devices are in the form of a rotating disk. In general, the disks are preformatted using pits (grooves) and gaps to enable positioning an optical pickup and recording head to access information on the disk. A focused laser beam emanating from the optical head records information on the media as a change in the material characteristics.

Production of multi-layered memory carrier with fluorescent reading shows promise for increasing capacity of optical-storage medium. A method for constructing a multi-layered optical fluorescent disc is disclosed in [1], in accordance with which replicas of single-layer discs are produced by the Injection Molding method, where pits are filled with a fluorescent, dilute composition. The single layer discs are stuck one to another, so that active layers consisting of fluorescent pits with a depth of 0.5 $\mu$m are interleaved with non active separation layers of 20–50 $\mu$m depth and which are transparent to wavelengths of exciting laser and fluorescent light. Fluorescent compositions for use in the above-mentioned multi-layer disc have been suggested [2].

The basic requirements for such fluorescent compositions are: suitable penetration into pits without dying the spaces between them, inactivity towards substrate materials such as polycarbonate (PC) or polymethylmethacrylate (PMMA) and the quantum output of the fluorescent material used in such formulations must be as high as possible and must not decrease during long-term storage and operation.

These requirements significantly restrict the choice of the components of a fluorescent composition, namely, film-forming polymers, plasticizers and solvents, to such components which are not aggressive towards substrates made of PC or PMMA. Another obstacle hampering the mass production of multi-layer fluorescent discs, by the injection molding method, is the technological complexity of manufacturing single-layer discs with a thickness of 20–50 $\mu$m and containing pits with a depth of 0.5 $\mu$m.

There are known in the art replication techniques such as hot embossing or thermo- or UV-casting/embossing [3]. Such replication techniques are already used for the commercial production of submicron grating structures (hot embossed diffractive foil and security holograms). However, replication processes based on hot embossing into thermoplastic resins, or on casting/embossing with thermosetting resins or UV-curable polymers have not been applied for production of multi-layered optical information carriers with fluorescent reading of ROM, WORM and Rewritable types.

The possibility of obtaining multi-layer optical data carriers by mechanical printing, by using photoluminescent materials was described in [9]. However, there is no information in this patent regarding a structure of multi-layer carrier materials, as well as a specific production method, that would allow the implementation in practice of the method for manufacturing a multi-layer carrier of fluorescent memory with the required parameters.

The production of the above-mentioned products (media) by techniques of hot embossing or thermo- or UV-casting/embossing depends on several parameters, among them are the following:

1. Development of fluorescent compositions suitable to produce ROM, WORM, and Rewritable type information carriers and methods of deposition of such fluorescent compositions on flexible substrates.
2. Formation of surface relief in a form of a pattern or a plurality of discrete portions of an active fluorescent material (pit, spiral, track, ect.) by the methods of hot embossing or thermo- or UV-casting/embossing.
3. Filling the recesses of a patterned structure with polymeric materials in order to eliminate diffraction and to obtain a transparent layer containing fluorescent discrete structures (pits, tracks, etc.).
4. Sticking together single-layer films carrying fluorescent optical information in order to obtain a multi-layer optical carrier.

The above-mentioned parameters are dealt with in the present invention.

SUMMARY OF THE INVENTION

By taking the above-mentioned into consideration, a major object of the present invention is to provide a method for manufacturing multi-layer fluorescent optical information carrier of ROM, WORM and Rewritable memory types in the form of CDs, cards or similar products, such carriers providing high density of optical memory, high resolution, high fluorescence signal and high signal-to-noise ratio.

It is a further object of the present invention to provide such a method which is suitable for manufacturing fluorescent optical information carriers, having high stability and quality of information playback, reduces the cost of the media and of the device of reading of fluorescent signals.

There is thus provided according to one aspect of the present invention a method of manufacturing a multi-layer optical information carrier with fluorescence reading/recording, the method comprising the steps of:

(i) fabricating a structure formed of a substrate carrying a fluorescent layer on at least one surfaces thereof, the substrate being transparent with respect to incident radiation used for the fluorescence reading/recording;

(ii) subjecting said structure to a replication technique such as to produce a fluorescent patterned structure with a surface relief in the form of an array of discrete fluorescent regions;

(iii) repeating steps (i) and (ii), so as to obtain a plurality of fluorescent patterned structures, (iv) joining together said plurality of separate fluorescent patterned structures so as to form a multi-layer optical information carrier.

The multi-layer optical information carriers produced by the above method constitute another aspect of the invention.

Thus, according to a preferred embodiment of the invention, the method of the present invention contemplates the use of fluorescent compositions which comprise a thermoplastic polymer capable of passing into viscous-fluidic state at increased temperature and an organic dye or mixtures of dyes, in order to perform the formation of a surface relief by the method of hot stamper or roller embossing. The organic dye is selected according to the specific type of the information carrier to be manufactured, namely a dye suitable for a fluorescent ROM material [2], or dyes and appropriate additives according to [2, 4, 5] suitable for a fluorescent WORM material, or photochromic substance according to [6, 7] suitable for a fluorescent Rewritable material.

In accordance with another embodiment, the method of the invention contemplates the use of a fluorescent composition, consisting of a thermo-setting or UV-curable material able to be hardened under conditions of increased temperature, or exposure to UV irradiation, and an organic dye, in order to form a patterned structure by the method of stamper or roller embossing or thermo- or UV-casting/embossing. The organic dye may be selected, as explained above according to the specific type of the information carrier to be manufactured.

In the method of the invention, the recesses of a patterned structure produced by hot embossing or thermo- or UV-casting/embossing are filled with a transparent polymer substance in order to eliminate diffraction and to obtain a transparent layer containing fluorescent discrete structures (pits, spiral tracks, etc.).

Single-layer materials are joined together so that the active layers containing fluorescent structures are interleaved, with separation layers formed by the substrate of each single layer. Single layer materials can also be joined together without preliminary filling of the surface recesses. In this case, the adhesive used when joining together single-layer materials so as to form a multi-layer structure, fills the recesses during the adhering process.

BRIEF DESCRIPTION OF THE DRAWINGS

In order to understand the invention and to see how it may be carried out in practice, preferred embodiments will now be described, by way of non-limiting example only, with reference to the accompanying drawings, in which.

DETAILED DESCRIPTION OF PREFERRED EMBODIMENTS

Figure 1:
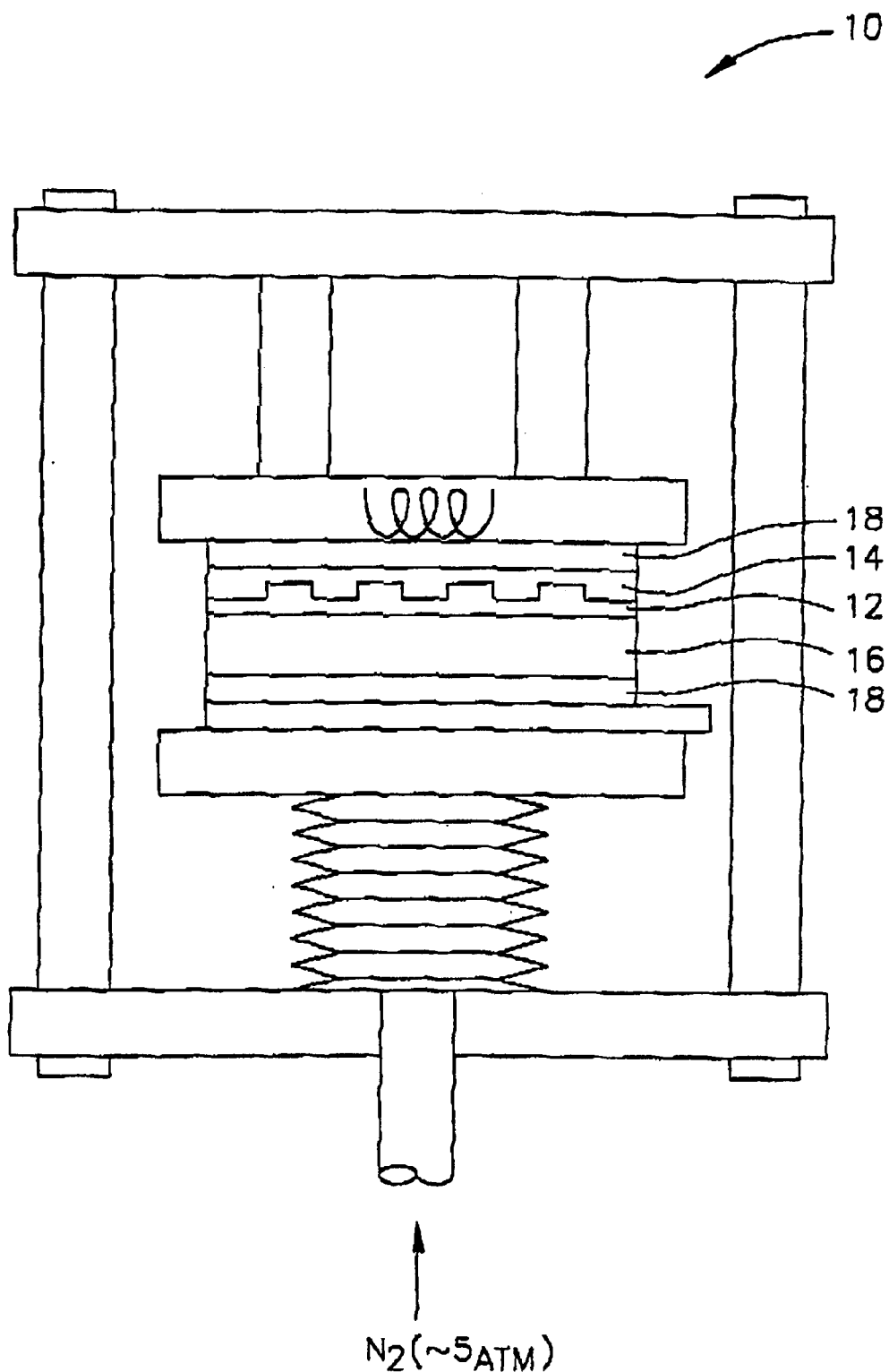
FIG. 1 is a schematic illustration of a hot embossing process.

Let us consider a first embodiment of the invention contemplating the use of the hot embossing method for formation of a pattern of a plurality of discrete portions of an active fluorescent material.

A multi-layer fluorescent carrier of ROM type is formed of single layers. Such single layers are formed as follows: a mediating layer (if necessary) and a fluorescent composition comprising a fluorescent dye, a thermoplastic polymer, plasticizer and optionally further additives, are subsequently applied to the surface of a transparent substrate having a thickness of 20–200 $\mu$m and a flat, glossy surface, by spin coating, roller coating, dip coating or extrusion techniques. The thickness of the fluorescent layer is 0.04–0.4 $\mu$m. The substrate layer comprises conventional polymers which are transparent to the laser light used, for example polycarbonate, polypropylene, polyester, polyethylene terephthalate, polyvinyl chloride, perchlorovinyl, cellulose acetyl, polyurethane, polyamide, and many other transparent media.

The mediating layer (primer) consists of materials, which have a good adhesion to the substrate and dispense uniformly over the surface of the substrate, thus forming a film with a thickness of 0.01–30 $\mu$m, that is impermeable to solvents and other ingredients of the active fluorescent layer. Good adhesion of the fluorescent layer to the primer must also be provided.

To form the primer layer, it is possible to use materials such as liquid glass, the product Colcoat N-103X manufactured by Colcoat Co., Ltd. (Japan), polyvinyl alcohol treated thermally after being applied on the substrate, thermosetting resins including epoxide, phenol-, carbamide- and melamine-formaldehyde resins, polyorganosiloxanes, as well as latexes, such as butadiene-styrene latex, butadiene-nitrile latex, styrene acrylate latex, alkyd latex, acrylate latex and so on.

The fluorescent dye used in the active layer is characterized by maximum absorption close to the wavelength of the reading/recording laser, and is selected from coumarines, xanthene dyes of the eosine and rhodamine groups, acridine, oxazine, azine, perylene, violanthrone, cyanine, phthalocyanine dyes, indigoides and porphirins. The content of the fluorescent dye in the active layer is 0.1–10%.

Examples of thermoplastic polymers which may be used are vinylic resins, such as polyvinyl acetate, polyvinyl butyral, polyvinylacetal, acrylic resins such as polymethylmetacrylate, polybutylacrylate, polyacrylic amide and polyacrylonitrile, polyvinylchloride, perchlorovinyl resin etc.

Film-forming properties of the utilized resins, and plasticity of the active layer can be improved by adding 5–40% of a suitable plasticizer, such as dibutyl phthalate, dioctyl phthalate or tricresil phosphate.

In order to form the active layer, the above-mentioned ingredients are dissolved in a suitable organic solvent to obtain a homogeneous composition and the resulting composition is applied to the surface of the substrate by spin coating, roller coating, dip coating or extrusion. Examples of suitable organic solvents are alcohols, ketones, amides, sulfoxides, ethers, esters, halogenated aliphatic hydrocarbons or aromatic solvents. More specific examples of such solvents include methanol, ethanol, iso-propanol, tetrafluoroethanol, diacetone alcohol, methyl cellosolve, ethylcellosolve, acetone, methylethylketone, cyclohexanone, N,N-dimethylformamide, dimethylsulfoxide, dioxane, ethylacetate, chloroform, metlylene chloride, dichlorethane, toluene, xylene or mixtures thereof. After coating the active fluorescent layer is dried.

The obtained fluorescent layer has thermoplastic properties, i.e. when it is subjected to fusion at 90° C.–170° C., it does not undergo any chemical transformations. The formation of information pits on the active layer is carried out by the hot embossing method, by using a stamper device in which hollows are located at the sites of the information pits, and projections are located between them. The height of the projection is chosen so that, at a given thickness of the fluorescent layer, the volume of the melted mass of fluorescent composition, which was squeezed out by the projections, corresponds to the volume of the hollows between the projections. The projections squeeze out all the fluorescent material, substantially up to the substrate, thus formig information pits exhibiting a fluorescent property. In other words, under hot embossing, a surface relief is formed, the thickness of which increases in accordance with the volume of the fluorescent layer mass squeezed out by the projections.

It is also possible to use a stamper device with projections located at the sites of the information pits, and hollows located between the projections. In this case, after hot embossing, the projections, exhibiting a fluorescent property, are formed on the surface of the carrier, and the hollows between them form the information pits.

In order to eliminate diffraction of the formed surface relief and to obtain a transparent layer containing the fluorescent information pits, the gaps between the pits are filled with a polymeric material, for example thermoplastic polymers, latex substances or UV-curable adhesives.

In order to obtain a multi-layer fluorescent information carrier, the single-layer films, produced by the above method in disc form of various dimensions, cards, etc., are adhered one to another, by forming a multi-layer system, consisting of active layers that are interleaved with substrate layers.

Production of a WORM type multi-layered fluorescent information carrier, by the hot embossing method, differs from the previous method by application, in the active layer, of dyes and appropriate additives that enable a single record of information. The record is based on an irreversible change in the fluorescent properties of the active layer upon exposure to laser radiation. Examples of such dyes are for example cyanine dyes, phthalocyanine dyes, porphirins, or those described in [1, 4, 5].

Production of a Rewritable type multi-layered fluorescent information carrier, by the hot embossing method, differs from the previous method by the application, in the active layer, of photochromic substances, providing multiple cycles of recording-reading-deleting, instead of dyes and additives intended for WORM material. Examples of such substances are spirobenzopyranes, naphthacenequinones or those described in [6, 7].

Another embodiment of the present invention contemplates the application of the thermo-casting/embossing method for the formation of a pattern, or a plurality of discrete portions of an active fluorescent material for the production of multi-layer optical fluorescent information carriers of the ROM, WORK and Rewritable types. In this embodiment the active layer is applied for example in the form of a paste and it contains a thermo-setting substance which can be hardened at an increased temperature. Thermosetting substances can be selected from a wide range of resins which may, at times, require the usage of hardeners. Examples of such resins include epoxide, phenol-, carbamide- and melamine-formaldehyde resins, polyorganosiloxanes, polyurethanes, and so on. Formation of the surface relief is carried out by a stamper and then a heating step up to 80–170° C. is applied in order to harden the thermo-setting material.

The subsequent stages of the technological process are similar to the first embodiment.

A third embodiment of the present invention contemplates the application of the UV casting/embossing method for the formation of a pattern or a plurality of discrete portions of an active fluorescent material. This embodiment differs from the previous embodiment in using UV-curable materials, which can be selected from a wide range of adhesives, manufactured by companies such as Dymax Corporation (USA), Thorlabs Inc. (USA), Summers Laboratories (USA) etc. Another example of a UV-curable material is the dry photopolymer SURPHEX (Du Pont) [8], which may be laminated onto a substrate. Active layers based on UV-curable materials after coating on a substrate, are subjected to a Ni stamper and then UV-cured under pressure.

The subsequent stages of the technological process are similar to the previous embodiment.

The third embodiment may be used in the production of multi-layer optical fluorescent information carriers of the ROM, WORM, and Rewritable types, but is best suited for production of ROM-type media.

A fourth embodiment of the method of the invention for producing multi-layer optical fluorescent information carrier differs from the previous embodiments in forming first replicas (a surface relief) in a thermoplastic substrate that is transparent to exciting and fluorescent light. In this case a fluorescent composition suitable for obtaining ROM, WORM or Rewritable type material is deposited on the surface of another transparent substrate to form a fluorescent layer and both fluorescent layer and thermoplastic layer with replicas are joined together with simultaneous filling of pits. When a thermo-setting polymer is used, this process is carried out at a temperature which is higher by at least 10° C. than Tg of said polymer and under a pressure of 3–5 atm.

Obtaining of a multi-layer fluorescent information carrier can be carried out by joining together film replicas having surface relief on both surfaces and substrate material coated on both surfaces with fluorescent composition. In this case double-side replicas are interleaved during bonding with substrates coated on both surfaces with fluorescent adhesive composition.

The invention will be further described in more detail with the aid of the following non-limiting examples.

EXAMPLE 1

Fluorescent compositions were prepared in diacetone alcohol, using 2% by weight PVC (polyvinylchloride) chlorinated and 1.3% by weight (with respect to PVC chlorinated), of Oxasine 1. The fluorescent solution obtained was filtered, deaerated at 40° C., and applied on a PVC film having a thickness of 40 microns. A layer with a 0.15 μm thickness was obtained by means of K Control Coater (RK Print-Coat Instruments Ltd., UK), The film with the applied thermoplastic fluorescent composition was dried at 70° C. for 20 minutes, and then subjected to hot embossing, by using the press 10 shown in FIG. 1. The film 12 was placed between a Ni stamper 14 and an optically-polished unit 16, and was heated at 100° C. under a pressure of 5 atm. The Ni stamper and the optically-polished unit are surrounded by rubber sheets 18. After removing the pressure and cooling below 50° C., the film was separated from the stamper. By doing so, a relief stamped by the stamper is formed on the surface of the film.

In order to form a multi-layer material, single layer films were stack to one another successively, by using the optical UV-curable adhesive Norland NOA61. By doing so, the diffraction is eliminated due to filling the recesses wit adhesive.

The produced material exhibited a high fluorescence signal (quantum output of the fluorescence about 100%) and satisfactory contrast (signal-to-noise ratio equals 4). The maximum absorption of the material was at 650 nm and its maximum fluorescence at 680 nm. The information was read with a diode laser having a 640 nm radiation wavelength.

EXAMPLE 2

A similar method as in Example 1 was performed but with a polyester film of 100 microns thickness as a substrate. The quantum output of fluorescence was 55%, contrast—2.

EXAMPLE 3

A similar method as in Example 1 was performed but with polymethylmetacrylate as the thermoplastic polymer instead of PVC chlorinated, and a polyester film of 100 microns thickness as a substrate. Hot embossing was carried out at 115° C. The quantum output of fluorescence was 50%, contrast—2.5.

EXAMPLE 4

A similar method as in Example 1 was performed but with polyvinylacetate as thermoplastic polymer. The quantum output of fluorescence was 60%, contrast—2.0.

EXAMPLE 5

Figure 2:
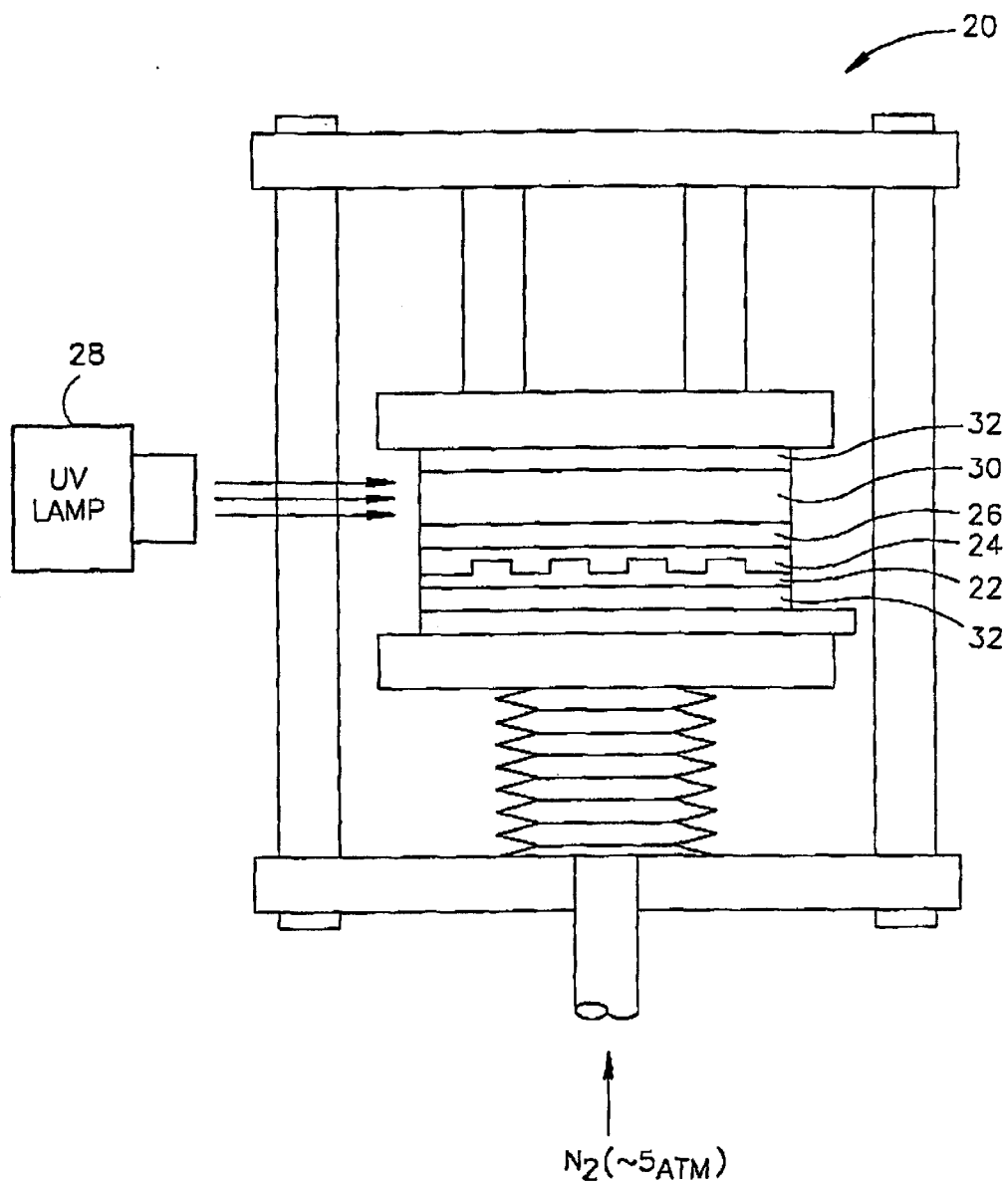
FIG. 2 is a schematic illustration of a UV casting/embossing process.

A 0.03 molar solution of the fluorescent dye Oxasine 1 in UV-adhesive 203705 (Locate Corporation, USA) was prepared. This solution was applied in a press 20 shown schematically in FIG. 2, to the surface of a nickel stamper 22 by means of a centrifuge to form a fluorescent layer 24. A substrate 26 constituting of a 80 μm polycarbonate film was laid on the stamper. Then the UV-casting/embossing process was carried out as follows: the structure was subjected to a pressure of 4–5 atm. and, at the same time, was exposed to UV irradiation from a UV lamp 28 directed to the end of a flat block 30 made of quartz glass. The power of the UV lamp was 400 W, and the exposure duration was 3 seconds. The flat flock 30 and the Ni stamper are surrounded by rubber sheets 32.

The substrate with the photohardened fluorescent composition, forming the relief stamped by the stamper, was separated from the stamper and the material was subjected to lamination. Five single layer materials were stuck together in order to produce a multi-layer material, having quantum output of fluorescence of 50%, contrast—2.5.

EXAMPLE 6

A similar method as in Example 5 was performed but with the film Bicor MB777, 42 microns thickness (Mobil Plastics Europe) as a substrate. The quantum output of fluorescence was 75%, contrast—3.0.

EXAMPLE 7

A similar method as in Example 5 was performed but with a polyester film of 100 microns thickness as a substrate. The quantum output of fluorescence was 50%, contrast—4.0.

What is claimed is:

1. A method of manufacturing a multi-layer optical information carrier with fluorescence reading/recording, the method comprising the steps of:
   (i) fabricating a structure formed of a substrate carrying a fluorescent layer on at least one surface thereof, said substrate being transparent with respect to incident radiation used for the fluorescence reading/recording;
   (ii) subjecting said structure to a replication technique such as to produce a fluorescent patterned structure with a surface relief in the form of an array of discrete fluorescent regions;
   (iii) repeating steps (i) and (ii), so as to obtain a plurality of fluorescent patterned structures; and
   (iv) joining together said plurality of separate fluorescent patterned structures so as to form a multi-layer optical information carrier.

2. The method of claim 1, wherein in step (i) a fluorescent composition is applied to one surface of said substrate.

3. The method of claim 2, wherein said composition is applied to the surface of said substrate by spin-coating, roller-coating, dip-coating or extrusion.

4. The method of claim 1, wherein in step (i) a mediating inert layer is applied first to the surface of the substrate, and then a fluorescent composition is applied on the mediating inert layer.

5. The method of claim 1, wherein the surface relief obtained in step (ii) is in the form of pits and gaps, the method comprising the step of filling the gaps with a polymer material transparent with respect to incident radiation used for the fluorescence reading/recording.

6. The method of claim 1, wherein said replication technique in step (ii) is a hot embossing technique.

7. The method of claim 1, wherein said replication technique in step (ii) is a thermo-casting/embossing technique.

8. The method of claim 1, wherein said replication technique in step (ii) is a UV-casting/embossing technique.

9. The method of claim 1, wherein at least one of the layers in said information carrier is of a Read-Only-Memory (ROM) type.

10. The method of claim 9, wherein the pattern in said patterned structure is representative of stored digital information.

11. The method of claim 1, wherein at least one of the layers in said information carrier is of a Write-Once-Read-Many (WORM) type.

12. The method of claim 1, wherein at least one of the layers in said information carrier is of a Rewritable type.

13. The method of claim 1, wherein said plurality of layers obtained in step (iii) is a combination of ROM, WORM and Rewritable type memory layers.

14. The method of claim 1, wherein said plurality of separate fluorescent patterned structures are adhered one to another in step (iv), so as to form a multi-layer optical information carrier, consisting of layers with a surface relief in the form of an array of discrete fluorescent regions that are interleaved with substrate layers.

15. A multi-layer optical information carrier with fluorescence reading/recording obtainable by the method of claim 1.

16. The carrier of claim 15, wherein at least one of the layers in said information carrier is of a Read-Only-Memory (ROM) type.

17. The carrier of claim 16, wherein the pattern in said patterned structure is representative of stored digital information.

18. The carrier of claim 15, wherein at least one of the layers in said information carrier is of a Write-Once-Read-Many (WORM) type.

19. The carrier of claim 15, wherein at least one of the layers in said information carrier is of a Rewritable type.

20. The carrier of claim 15, said plurality of layers being a combination of ROM, WORM and Rewritable type memory layers.

21. A method of manufacturing an optical information carrier with fluorescence reading/recording, the method comprising the steps of:

(i) fabricating a structure formed of a substrate carrying a fluorescent layer on at least one surface thereof, said substrate being transparent with respect to incident radiation used for the fluorescence reading/recording;

(ii) joining said structure under predetermined conditions, with at least one substrate having surface relief in the form of information pits, wherein said pits are simultaneously filled with fluorescent material from said structure, (iii) optionally, repeating steps (i) and (ii) so as to obtain a multi-layer optical information carrier.

22. A method according to claim 21, wherein said substrate used in step (ii) is thermoplastic.

23. A method according to claim 21, wherein said substrate used in step (ii) is transparent with respect to incident radiation used for the fluorescence reading/recording.

24. A method according to claim 21, wherein said substrate used in step (ii) has a surface relief in the form of information pits on both surfaces thereof.

25. A multi-layer optical information carrier with fluorescence reading/recording obtainable by the method of claim 21.

26. The carrier of claim 25, wherein at least one of the layers in said information carrier is of a Read-Only-Memory (ROM) type.

27. The carrier of claim 26, wherein the pattern in said patterned structure is representative of stored digital information.

28. The carrier of claim 25, wherein at least one of the layers in said information carrier is of a Write-Once-Read-Many (WORM) type.

29. The carrier of claim 25, wherein at least one of the layers in said information carrier is of a Rewritable type.

30. The carrier of claim 25, said plurality of layers being a combination of ROM, WORM and Rewritable type memory layers.

31. A method of manufacturing a multi-layer optical information carrier with fluorescence reading/recording, the method comprising the steps of:

(i) fabricating a substrate having on one surface thereof a surface relief in the form of information pits, said substrate being transparent with respect to incident radiation used for the fluorescence reading/recording;

(ii) applying a fluorescent layer to the second surface of said substrate so as to obtain a substrate having on one surface thereof a surface relief in the form of information pits and on the other surface thereof a fluorescent layer;

(iii) repeating steps (i) and (ii) so as to obtain a plurality of substrates;

(iv) joining said structures under predetermined conditions, wherein said pits of one substrate are simultaneously filled with fluorescent material of another substrate, so as to obtain a multi-layer optical information carrier.

32. A multi-layer optical information carrier with fluorescence reading/recording obtainable by the method of claim 31.

* * * * *